(12) United States Patent
Gerstlauer et al.

(10) Patent No.: US 7,825,395 B2
(45) Date of Patent: Nov. 2, 2010

(54) DEVICE AND METHOD FOR READING OUT X-RAY INFORMATION STORED IN A PHOSPHOR LAYER

(75) Inventors: Bernd Gerstlauer, Munich (DE); Detlef Brautmeier, Unterschleiβheim (DE); Axel Kasper, Munich (DE)

(73) Assignee: Agfa-Gevaert Healthcare GmbH, Cologne (DE)

( * ) Notice: Subject to any disclaimer, the term of this patent is extended or adjusted under 35 U.S.C. 154(b) by 125 days.

(21) Appl. No.: 11/169,110

(22) Filed: Jun. 28, 2005

(65) Prior Publication Data
US 2005/0285061 A1  Dec. 29, 2005

(30) Foreign Application Priority Data
Jun. 29, 2004  (EP) ................... 04103049

(51) Int. Cl.
*G11B 7/135* (2006.01)
(52) U.S. Cl. .................................................. 250/586
(58) Field of Classification Search ............... 250/586
See application file for complete search history.

(56) References Cited

U.S. PATENT DOCUMENTS

| | | | | |
|---|---|---|---|---|
| 4,484,073 A | | 11/1984 | Ohara et al. | |
| 4,700,066 A | * | 10/1987 | Horikawa | 250/234 |
| 4,785,183 A | * | 11/1988 | Tsuchino et al. | 250/585 |
| 5,028,784 A | | 7/1991 | Arakawa et al. | |
| 5,898,184 A | | 4/1999 | Stahl et al. | |
| 6,580,525 B1 | | 6/2003 | Iwakiri et al. | |
| 2002/0024027 A1 | | 2/2002 | Yamada | |
| 2002/0043625 A1 | * | 4/2002 | Shimizu et al. | 250/458.1 |
| 2005/0247897 A1 | | 11/2005 | Haug et al. | |

* cited by examiner

*Primary Examiner*—David P Porta
*Assistant Examiner*—Carolyn Igyarto
(74) *Attorney, Agent, or Firm*—Houston Eliseeva, LLP

(57) ABSTRACT

A method reads out X-ray information stored in a storage phosphor layer where an X-ray picture is obtained and made up from a number of pixels. The method includes the steps of: irradiating the storage phosphor layer with a stimulation light beam which is moved along a line over the storage phosphor layer to stimulate the storage phosphor layer into emitting emission light; collecting emission light emitted from the storage phosphor layer, and converting the emission light collected into a corresponding detector signal S; deducing a number of detector signal values D from the detector signal S, where the number of deduced detector signal values D is greater then a predetermined number of pixels of the X-ray picture along the line; and deducing a picture signal value B for each pixel of the X-ray picture along the line from at least two of the detector signal values D.

28 Claims, 2 Drawing Sheets

DEVICE AND METHOD FOR READING OUT X-RAY INFORMATION STORED IN A PHOSPHOR LAYER

This application is related to U.S. patent application Ser. No. 11/112,638 filed on Apr. 22, 2005. The invention relates to a method for reading out X-ray information stored in a storage phosphor layer whereby an X-ray picture made up from a number of pixels is obtained.

BACKGROUND OF THE INVENTION

X-ray pictures can be stored in so-called storage phosphors, whereby the X-ray radiation passing through an object, for example a patient, is stored as a latent picture in a storage phosphor layer. In order to read out the latent picture, the storage phosphor layer is irradiated with stimulation light, and so stimulated into emitting emission light. The emission light, the intensity of which corresponds to the picture stored in the storage phosphor layer, is collected by an optical detector and converted into electric signals. The electric signals are further processed, as required, and finally made available for examination, in particular for medical diagnostic purposes, whereby they are displayed in a corresponding display unit, such as a monitor or a printer.

In the patent document U.S. Pat. No. 4,484,073, herein incorporated by reference in its entirety for background information only, a device and a method are described whereby a laser beam is deflected by means of a galvanometer mirror in such a way that the laser beam hits the storage phosphor layer to be read out substantially in the form of a point, and passes over this in a linear area. The emission light emitted here by the storage phosphor layer is collected by a photomultiplier, and converted into an electric signal. By conveying the storage phosphor layer perpendicularly to the linear area, it is possible to successively read out individual linear areas of the storage phosphor layer so that finally, a two dimensional X-ray picture is obtained which is made up from individual lines which, in turn, are respectively made up from a number of individual pixels. In order to convert the electric signal of the photomultiplier into individual picture signals allocated to the respective pixels of the X-ray picture, a position reference pulse is produced for each pixel of a line by means of a so-called linear encoder, and the electric signal of the photomultiplier is respectively integrated over a fixed interval of time in accordance with a position reference pulse. The signal value obtained during the respective integration is allocated to the corresponding pixel.

Because the speed of the deflection element is generally liable to fluctuations, the speed of the laser beam is not constant over the whole of the line to be read out, ie. within the predetermined, fixed interval of time, and in accordance with a position reference pulse, the laser beam passes over areas of the storage phosphor layer with different widths, dependent upon the momentary speed. The consequence of this is that, during the described integration of the electric signal of the photomultiplier, areas of different width are generally collected. A high momentary speed of the laser beam thus means that, in the predetermined interval of time, a relatively wide section of the area corresponding to a pixel is scanned by the laser beam. On the other hand, a lower momentary speed leads to the collection of a relatively narrow section of an area of the line allocated to a pixel. Overall therefore, a partial loss of information and so an adverse effect upon the picture quality of the X-ray picture read out has to be accepted.

SUMMARY OF THE INVENTION

It is the aim of the invention to provide a method for reading out X-ray information stored in a storage phosphor layer whereby, in particular with reduced loss of information, the picture quality is improved.

The above and other problems in the prior art are solved by a method for reading out X-ray information stored in a storage phosphor layer whereby an X-ray picture is obtained which is made up from a number of pixels. The method includes the steps of: irradiating the storage phosphor layer with a stimulation light beam which is moved along a line over the storage phosphor layer to stimulate the storage phosphor layer into emitting emission light; collecting emission light emitted from the storage phosphor layer, and converting the emission light collected into a corresponding detector signal S; deducing a number of detector signal values D from the detector signal S, where the number of deduced detector signal values D is greater then a predetermined number of pixels of the X-ray picture along the line; and deducing a picture signal value B for each pixel of the X-ray picture along the line from at least two of said detector signal values D.

The invention is based upon the notion of deducing for each of the individual pixels in a line of the X-ray picture respectively two or more detector signal values from the detector signal, and of calculating from these a picture signal value corresponding to each pixel respectively. Because detector signal values are deduced from two or more different points of a pixel, from which a picture signal value is then calculated for this pixel, information losses are reduced in comparison to the methods known from the prior art. Moreover, by calculating a picture signal value of a pixel from two or more individual detector signal values, the noise is reduced in comparison with those methods where only one detector signal value is respectively deduced from the detector signal for each pixel. Overall, the picture quality of the X-ray picture read out is improved by means of the method in accordance with the invention.

In a preferred embodiment of the method, it is proposed that the detector signal values be deduced by sampling the detector signal with a sampling frequency which is greater than the reciprocal value of an average length of time which the stimulation light beam requires in the temporal medium for the movement over a pixel of the X-ray picture along the line. The sampling frequency set here is thus greater than the sampling frequency required to produce just one respective detector signal value per pixel.

Preferably, the sampling frequency is a whole number multiple of N of the reciprocal value of the average length of time. In this way it is possible that for each pixel of the X-ray picture read out, N detector signal values are deduced from the detector signal. In this way, information losses are greatly reduced over the whole length of the line of the X-ray picture to be read out.

Preferably, the number N takes a value of between 2 and 32, in particular between 4 and 16. In this way, despite a reduction of the information loss, the respectively produced quantity of data is kept comparatively small so that the respective picture signal values can be deduced quickly from the deduced detector signal values.

Another preferred embodiment of the method proposes that each picture signal value is obtained by forming an, in particular arithmetical, average value from respectively at least two, in particular N, detector signal values which are temporally consecutive. The formation of an average value represents a simple, efficient, and particularly reliable way of calculating the picture signal values from the respective detector signal values. By forming the arithmetical average value, a particularly high picture quality is achieved.

With another preferred embodiment of the method, the detector signal is sampled by deducing the individual detector signal values in accordance with the so-called "sample and hold" principle. By means of this, the detector signal values are deduced from the detector signal in a particularly simple way, with at the same time very little loss of information. In particular, in comparison with the device known from the prior art, a separate integrator circuit can be dispensed with here.

It is also preferred that the deduction of the picture signal value of a pixel from at least two detector signal values takes place directly after the deduction of the at least two detector signal values from the detector signal. The picture signal values of the pixels from one line are thus calculated while the line to be read out is still being scanned with the laser beam. The calculation of a picture signal value always takes place here directly after the deduction of the two or more detector signal values required for the calculation of the respective picture signal value, ie. as soon as the two or more required detector signal values are available for the calculation. In this way, storage space for the storage of picture information obtained from one line is kept low, and at the same time a separate subsequent processing step of detector signals after successful sampling of a line is avoided.

It is also preferred that the detector signal is filtered before sampling, whereby portions of the detector signal are eliminated if they have a frequency which is greater than half the sampling frequency. In this way, any picture artefacts produced by the sampling of high-frequency detector signal portions are avoided, and so the picture quality is improved still further.

DETAILED DESCRIPTION OF THE PREFERRED EMBODIMENTS

Figure 1:
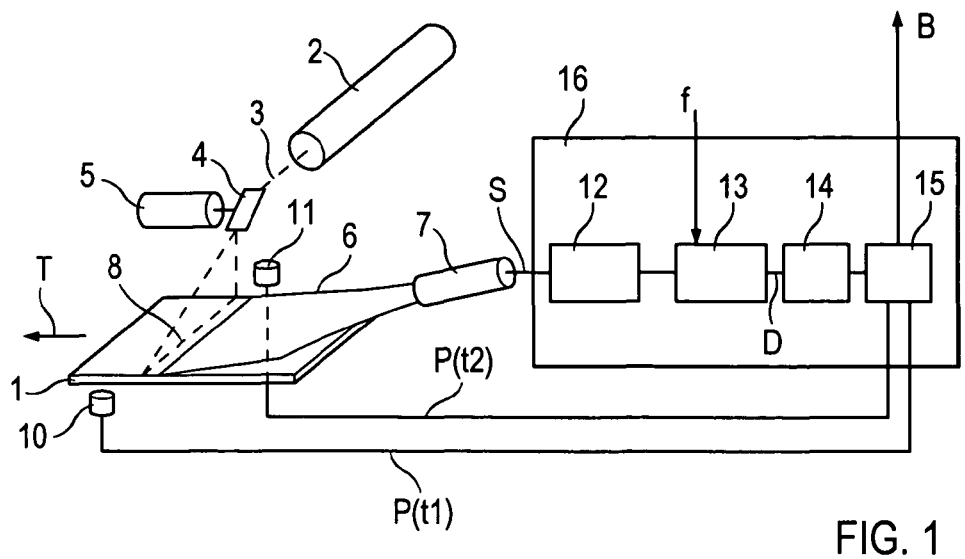
FIG. 1 shows a device for reading out a storage phosphor layer.

FIG. 1 shows a device for reading out a storage phosphor layer 1. By means of a laser 2, a stimulation light beam 3 is produced which is deflected in such a way by a deflection element 4 set in rotation by a motor 5 that this moves along a line 8 over the storage phosphor layer 1 to be read out. The storage phosphor layer 1 here emits emission light dependent upon the X-ray information stored in the layer, and this is collected by an optical collection device 6, for example a light conductor bundle, and collected by an optical detector 7, preferably a photomultiplier, and thus converted into a corresponding detector signal S. The deflection element 4 is preferably in the form of a mirror, such as a polygon mirror or a galvanometer mirror.

The detector signal S is fed into a processing device 16 in which picture signal values B are deduced for individual pixels of the X-ray picture which has been read out. If the line 8 read out is made up, for example, from 1000 pixels, 1000 corresponding picture signal values B are deduced from the detector signal S obtained from reading out the line 8.

By conveying the storage phosphor layer 1 in conveyance direction T, it is possible to read out successive individual lines 8, and so obtain a two-dimensional X-ray picture consisting of individual pixels respectively with a corresponding picture signal value B. If the number of the lines 8 read out in conveyance direction T is, for example, 1500, with 1000 pixels respectively per line, a total of 1500×1000 pixels are obtained for the X-ray picture read out respectively with a corresponding picture signal value B.

Figure 2:
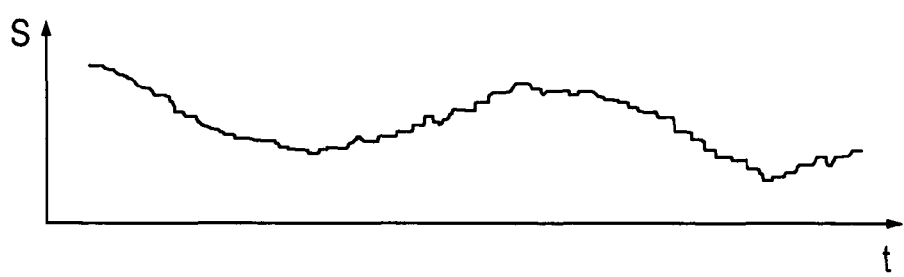
FIG. 2 shows a progression of the detector signal.

FIG. 2 shows an example of a progression of the detector signal S produced in the device in accordance with FIG. 1. The deduction of picture signal values B from the detector signal S in accordance with the invention will be described in greater detail below.

The detector signal S is first of all (see FIG. 1) filtered through a low pass filter 12, whereby higher frequency portions of the detector signal S, in particular noise portions, are eliminated. The filtered detector signal S is then fed into an analogue to digital converter 13, and there sampled with a sampling frequency f, whereby with each sampling process, a detector signal value D is obtained in respective digital units. The sampling of the detector signal S in the analogue to digital converter 13 preferably takes place in accordance with the so-called "sample and hold" principle, in accordance with which, when sampling, the respective current analogue signal height of the detector signal S on the analogue to digital converter 13 at the sampling time, is held, and converted into a corresponding digital detector signal value D. After intermediary storage in the storage unit 14, the picture signal values B are calculated from the detector signal values D in a calculating device 15.

The low pass filter 12 is preferably designed in such a way that it allows portions of the detector signal S to be eliminated if they have a frequency $f_g$, which is greater than half of the sampling frequency f so that $f_g > 0.5$ f. In this way, any picture artefacts produced by the sampling of high-frequency detector signal portions are avoided, and so the picture quality is improved even further.

Figure 3:
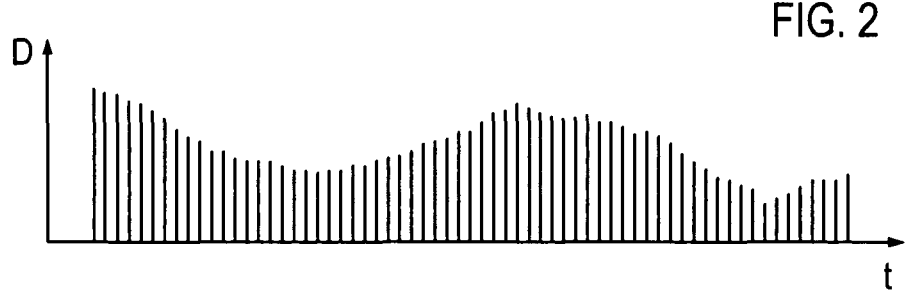
FIG. 3 shows detector signal values deduced from the detector signal.

FIG. 3 shows a number of detector signal values D deduced from the detector signal S shown in FIG. 2 over the time t. The interval of time between the individual detector signal values D is determined by the sampling frequency f of the analogue to digital converter 13. A specific point of the stimulation light beam 3 corresponds to each point in time here on the line 8 of the storage phosphor layer 1.

The sampling frequency f is chosen such that for each individual pixel along the line 8, at least two detector signal values B are obtained from which a picture signal value respectively corresponding to each respective pixel can then be calculated. For simplification and better clarity, it is assumed in this example that the line 8 read out consists of just 13 pixels. The sampling frequency f in this example is chosen such that for each of the 13 pixels, five detector signal values D are respectively obtained.

Figure 4:
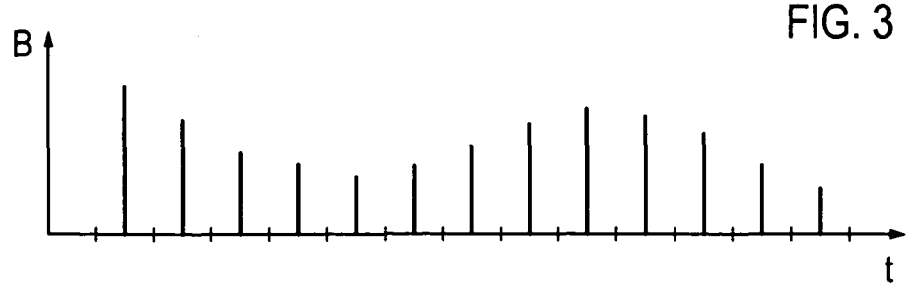
FIG. 4 shows an example of picture signal values deduced from the detector signal values.

The picture signal values B correspondingly deduced for this example are shown in FIG. 4, whereby a picture signal value B was calculated respectively from five of the detector signal values D respectively shown in FIG. 3, whereby the arithmetical average value was respectively established from the individual detector signal values D.

In this example, the sampling frequency f is five times the reciprocal value of an average length of time Δt which the stimulation light beam 3 requires in the temporal medium for the movement over a pixel of the X-ray picture along the line 8. The following example should clarify this: If the average period of time Δt for the movement of the stimulation light beam 3 over a pixel of the X-ray picture is on average one microsecond (1 μs), the resulting sampling frequency f is 5/Δt=5/1 μs=5 MHz.

It is also beneficial to calculate the picture signal value B of a pixel from the respective detector signal values D directly after deducing these detector signal values D from the detector signal S. The individual picture signal values B of the line 8 are therefore established parallel in time and simultaneously with the sampling of the line 8. The calculation of an individual pixel always takes place here directly after deducing the two or more detector signal values D from detector signal S necessary for the calculation of the respective picture signal values B. Because of this, only the detector signal values D respectively to be integrated into a picture signal value B need to be stored in the storage unit 14 of the processing device 16 before they can be further processed in the calculating unit 15. The storage requirement in the storage unit 14 is therefore low. Moreover, by means of the simultaneous processing of the detector signal values D during the read out of the line 8, subsequent processing of the detector signal values D after the end of the read-out of the line 8 can be dispensed with.

The repeated sampling of the detector signal S for each individual pixel, which is also called "oversampling", and the deduction of a corresponding picture signal value for each pixel of the line 8 from several detector signal values respectively, leads overall to a reduction of the noise superimposed on the detector signal S, and so to an improved picture quality with, at the same time, less information losses in comparison to the devices and methods known from the prior art.

Moreover, the picture quality can be improved still further in that at least a part of the detector signal values D deduced from the detector signal S can be corrected, whereby corrected detector signal values D are obtained, from which picture signal values B can be deduced. The correction here takes place preferably in that the respective height of these detector signal values (D) is changed, ie. raised or lowered. In this way, different influences upon the picture quality, in particular the sharpness of the picture, can be eliminated, or at least greatly reduced with a high level of accuracy. This particularly applies for the influence of the so-called afterglow of the storage phosphor layer 1 directly after stimulating a punctiform area of the line 8 by the stimulation light beam 3. But other influences which lead to losses in sharpness and/or picture artefacts, can in this way also be particularly reliably prevented or reduced.

In connection with this, it is particularly preferred to correct the detector signal values D in such a way that the height of a first detector signal value D is raised, and the height of an adjacent second detector signal value D is lowered. The reduction in the height of the second detector signal value D here can be a specific percentual portion of its height, e.g. 30%, whereby at the same time, the height of the adjacent first detector signal value D is raised by this absolute amount. Alternatively however, this absolute amount can also be distributed over the next adjacent detector signal value D, and the next one after that, e.g. 20% on the next adjacent value, and 10% on the adjacent value after that. In this way, the influence of the afterglow on the sharpness of the picture is particularly effectively reduced.

It should be stressed that the aforementioned correction methods lead to further improvement of the picture quality, in particular if these are carried out on the detector signal values D which were obtained by means of oversampling and are only used after the correction of the same for deducing the picture signal values B.

The signal processing of the detector signal S described in greater detail in connection with FIGS. 2 to 4 is particularly suitable for scanners with good synchronism properties, whereby the stimulation light beam 3 is moved with substantially unchanging speed over the respective line 8 of the storage phosphor layer 1 to be read out. This is generally achieved by means of optically high value deflection elements 4, in particular a galvanometer or polygon mirror, in conjunction with a motor 5 with good synchronism properties.

In order to further improve the picture quality of X-ray pictures read out with this type of scanner, or in the case of more cost-effective scanners with less good optical elements or synchronism properties to still achieve a high level of picture quality, the processing of the detector signal S described in greater detail below is preferably carried out.

With a first embodiment of this method, the corresponding device (see FIG. 1) has two sensors 10 and 11 which are located in the area of the start or the end of the line 8 along which the stimulation light beam 3 moves.

If the stimulation light beam 3 is deflected with the deflection element 4 in the direction of the line 8, this passes the first sensor 10 before scanning the line 8, and the second sensor 11 after scanning the line 8. The light of the stimulation light beam 3 is collected here by the two light-sensitive sensors 10 and 11, and converted into corresponding electric impulses P(t1) and P(t2) at reference times t1 and t2, and conveyed on to a calculating unit 15 of the processing device 16.

As already explained in detail, the detector signal S obtained during the movement of the stimulation light beam 3 over the line 8 of the storage phosphor layer 1 is filtered through a low pass filter 12 and sampled in an analogue to digital converter 13 with a sampling frequency f, whereby a number of detector signal values D are obtained. The detector signal values D are intermediarily stored in a storage unit 14.

The calculating unit 15 accesses the detector signal values D intermediarily stored in the storage unit 14, and from these deduces individual picture signal values B. The deduction of the picture signal values B, in particular the respective allocation of individual detector signal values D to a pixel, and the calculation of the picture signal value from the allocated detector signal values D, takes place with this embodiment of the signal processing dependent upon the reference times t1 and t2.

Figures 5A, 5B:
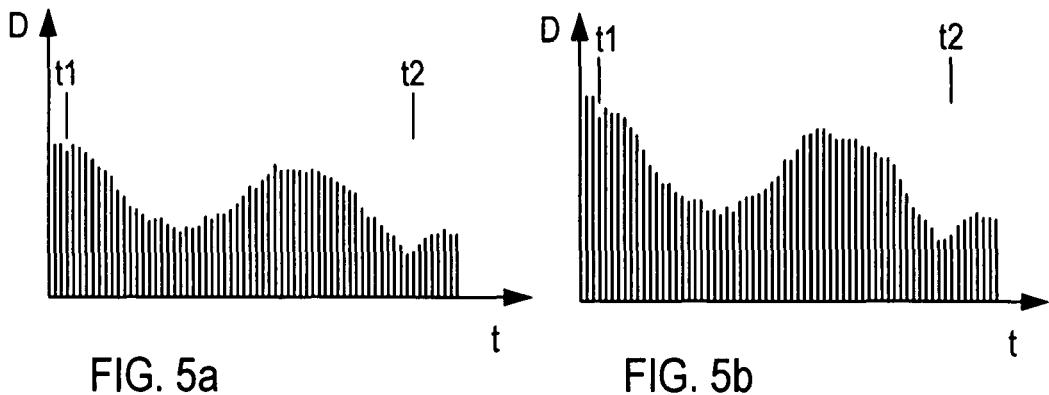
FIGS. 5a and 5b show further examples of picture signal values deduced from detector signal values.

FIG. 5a shows a first example of detector signal values D over the time t, which were deduced from the detector signal S for a line 8. In the diagram, as well as the detector signal values D, the two reference times t1 and t2 at which the stimulation light beam 3 passes the two sensors 10 and 11 are added. The detector signal values D which are relevant for a deduction of picture signal values B for the individual pixels of the X-ray picture along the line 8 lie between the two reference times t1 and t2. Correspondingly, only these detector signal values D are used for deducing the individual picture signal values B.

In another read-out process, the detector signal values D, shown as an example in FIG. 5b, are established for another line 8. Contrary to the example shown in FIG. 5a, the second reference time t2 is here only reached at a later time. This is due to the synchronism fluctuations of the stimulation light beam 3 during the movement of the same along the line 8. Considered in the temporal medium, the stimulation light beam 3 passes over the line 8 to be read out here with a speed which is lower than in the example shown in FIG. 5a.

This effect is compensated in accordance with the invention in that the detector signal values D collected respectively between the two reference times t1 and t2 are distributed to the predetermined number of individual pixels. If, for example, a line 8 of the X-ray picture read out includes, for example, 1000 pixels, and if, in the example shown in FIG. 5a, 5000 detector signal values D are deduced between the two reference times t1 and t2, five detector signal values are allocated respectively to every individual pixel and a picture signal value calculated from the respectively allocated detector signal values, in particular by establishing an average value.

For the example shown in FIG. 5b it is assumed that a total of 5100 detector signal values D are obtained between the two reference times t1 and t2. These are now also distributed to the 1000 predetermined pixels. If it is assumed, for example, that the synchronism fluctuations of the stimulation light beam are distributed substantially evenly over the whole length of time between the two reference times t1 and t2, on average 5.1 detector signal values D are allocated to each pixel, and a corresponding picture signal value deduced from this by establishing an average value.

This average value can, for example, be formed from a corresponding weighting of portions of the detector signal values D which are not whole numbers. For example, when establishing an average value in this way for the first picture signal value in the example specified in FIG. 5b, five detector signal values would respectively be weighted by 100%, and the following sixth detector signal value would be weighted by just 10%.

Alternatively, individual detector signal values can always be fully allocated to individual pixels. In the example shown in FIG. 5b, it would, for example be conceivable always to allocate five detector signal values D respectively to nine adjacent pixels, and to allocate six detector signal values respectively to the following tenth pixel. All further allocations of detector signal values D to pixels then take place correspondingly.

With these calculation methods, a statistically even distribution of speed fluctuations of the stimulation light beam 3 is assumed while the same moves over the line 8. In this way, picture errors arising from synchronism fluctuations of the stimulation light beam, such as so-called jitter effects can be reduced in a simple and reliable manner.

A method for further improving the picture quality proposes collecting the temporal behaviour of the movement of the stimulation light beam along a line, and taking this into account when deducing picture signal values B from the individual detector signal values D.

Figure 6:
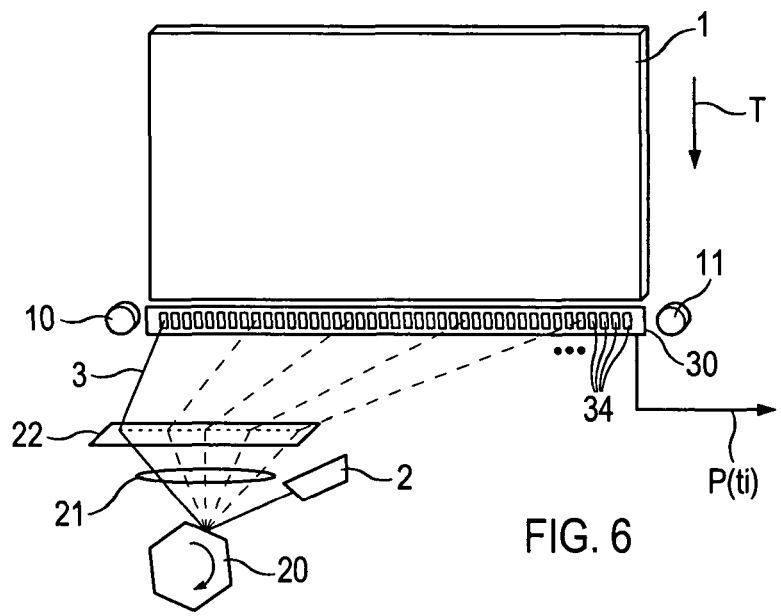
FIG. 6 shows an embodiment of the device for reading out a storage phosphor layer.

In FIG. 6, a preferred embodiment of a corresponding device for putting this method into practice is shown. The stimulation light beam 3 produced by a laser 2 is deflected by a rotating polygon mirror 20, and hits a sensor line 30 after having run through a suitable optical system which, in the example shown, consists of a lens 21 and a cylinder mirror 22. The sensor line 30 has a number of light-sensitive sensors 34 which are spaced apart at regular intervals. During the movement of the stimulation light beam 3 along the sensor line 30, this successively passes over the individual sensors 34. Here, a pulse P(ti) is respectively produced at a reference time ti, and this is conveyed on to a processing device (not shown).

The sensor line 30 can be positioned on the level of the storage phosphor layer 1, or alternatively also at a small distance in front of or behind the level of the storage phosphor layer 1.

Preferably, in this way, before the actual read-out of the storage phosphor layer 1, a number of reference times ti are collected during at least a full 360° rotation of the polygon mirror, and stored in the processing device. The sensor line 30 can then be removed from the course of the beam by means of a suitable mechanical pivoting device (not shown). If the sensor line 30 is positioned a small distance behind the storage phosphor layer 1, it can remain in its position, and when reading out the storage phosphor layer 1, it is obscured by the same.

The actual read-out process for the storage phosphor layer 1 can begin when the same is led along conveyance direction T on the course of the beam. If, as already explained in connection with FIGS. 1, 5a and 5b, a first and second reference time t1 and t2 are respectively collected by means of the two sensors 10 and 11, the allocation of the detector signal values D obtained between the two reference times t1 and t2 to individual pixels, while at the same time taking into account the previously collected reference times ti, can take place. The corresponding picture signal values B are then deduced from the allocated detector signal values D.

For the allocation of detector signal values D deduced from between two reference times tn and tn+1 respectively to the individual pixels, which lie between the nth and the (n+1)th reference position, the embodiments associated with the methods described in connection with FIGS. 5a and 5b apply correspondingly.

Figure 7:
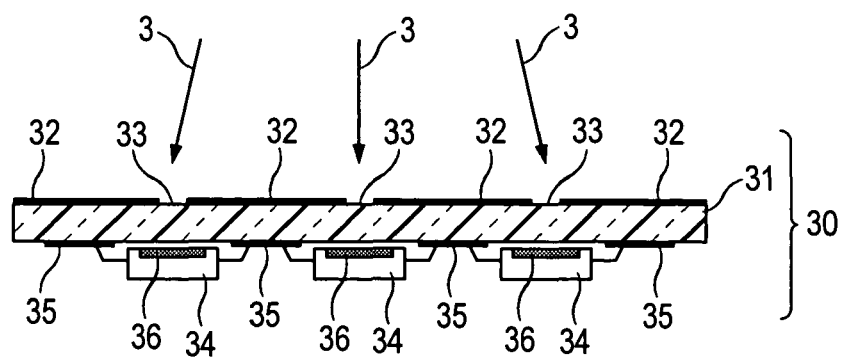
FIG. 7 shows a cross-section through the sensor line shown in FIG. 6.

FIG. 7 shows a cross section (section) through the sensor line 30 shown in FIG. 6. The sensor line 30 includes a conductor board 31 which consists of synthetic resin reinforced with glass fibres, and is at least partially transparent for the light of the stimulation light beam 3.

On the side of the conductor board 31 facing the stimulation light beam 3, individual slit apertures 33 are produced by masking a metal layer 32 located on top of this, which is preferably made from copper.

On the opposite side of the conductor board 31, the sensors 34, particularly in the form of photodiodes, are respectively applied in the area of the slit apertures 33, and these have a light-sensitive layer 36 on the side facing the conductor board 31. The sensors 34 are connected to conductor paths 35 located on the conductor board 31 and are correspondingly connected, for example by means of a parallel connection. Photodiodes of the SMD design, such as the BPW34 Reverse Gullwing type made by the company Osram® are particularly suitable as sensors 34.

By means of this embodiment of the sensor line 30, a particularly simple, compact and reliable collection of the reference times ti along the sensor line 30 is achieved. In this way, with the deduction of picture signal values B from the detector signal values D described above, a particularly high picture quality is achieved.

The invention claimed is:

1. Method for reading out X-ray information stored in a storage phosphor layer whereby an X-ray picture is obtained which is made up from a number of pixels, the method comprising the steps of:
   irradiating the storage phosphor layer with a stimulation light beam which is moved along a line over the storage phosphor layer to stimulate the storage phosphor layer into emitting emission light and irradiating sensors on either lateral side of the storage phosphor layer;

collecting emission light emitted from the storage phosphor layer, and converting the emission light collected into a corresponding detector signal and detecting responses of the sensors to generate a first reference time and a second reference time;

deducing a number of detector signal values from the detector signal, where the number of deduced detector signal values is greater than a predetermined number of pixels of the X-ray picture along the line;

allocating at least two detector signal values to each of the pixels along the line of the X-ray picture, each of the detector signal values being allocated in response to the first reference time and the second reference time; and generating the X-ray picture by deducing a picture signal value for each pixel of the X-ray picture along the line from the at least two of said detector signal values that were allocated to the pixel, which were detected from the same side of the storage phosphor layer.

2. Method in accordance with claim 1, wherein the deduction of the detector signal values includes sampling the detector signal with a sampling frequency f which is greater than a reciprocal value of an average length of time Δt which the stimulation light beam requires in a temporal medium for movement over a pixel of the X-ray picture along the line, where f>1/Δt.

3. Method in accordance with claim 2, wherein the sampling frequency f corresponds to a whole number multiple N of the reciprocal value of the average length of time Δt: f=N/Δt, where N is greater than 1.

4. Method in accordance with claim 3, wherein 2<N<32.

5. Method in accordance with claim 1, wherein each picture signal value is obtained by forming an arithmetical average value from at least two subsequent detector signal values.

6. Method in accordance with claim 2, wherein the sampling of the detector signal is in accordance with a sample and hold principle.

7. Method in accordance with claim 1, wherein the deduction of the picture signal value of a pixel occurs by forming an average value from said at least two detector signal values after deducing the at least two detector signal values from the detector signal.

8. Method in accordance with claim 2, wherein the detector signal is filtered before sampling, whereby portions of the detector signal are eliminated if they have a frequency $f_g$ which is greater than half the sampling frequency f so that $f_g$>0.5 f.

9. Method in accordance with claim 1, wherein at least one part of the detector signal values deduced from the detector signal is corrected, so that corrected picture signal values are deduced from the corrected detector signal values.

10. A method for reading out X-ray information stored in a storage phosphor layer whereby an X-ray picture is obtained which is made up from a number of pixels, the method comprising:

irradiating the storage phosphor layer with a stimulation light beam which is moved along a line over the storage phosphor layer to stimulate the storage phosphor layer into emitting emission light and irradiating sensors on either lateral side of the storage phosphor layer;

collecting emission light emitted from the storage phosphor layer, and converting the emission light collected into a corresponding detector signal and detecting responses of the sensors to generate a first reference time and a second reference time;

deducing a number of detector signal values from the detector signal, where the number of deduced detector signal values is greater than a predetermined number of pixels of the X-ray picture along the line;

allocating at least two detector signal values to each of the pixels along the line of the X-ray picture, each of the detector signal values being allocated in response to the first reference time and the second reference time; and generating the X-ray picture by deducing a picture signal value for each pixel of the X-ray picture along the line from the at least two of said detector signal values that were allocated to the pixel;

wherein at least one part of the detector signal values deduced from the detector signal is corrected, so that corrected picture signal values are deduced from the corrected detector signal values; and wherein the detector signal values are corrected, so that a respective height of each detector signal value is changed.

11. Method in accordance with claim 10, wherein detector signal values are corrected, whereby a height of a first said detector signal value is increased, and a height of an adjacent second said detector signal value is reduced.

12. A system for reading out X-ray information stored in a storage phosphor layer, the system comprising:

a laser for irradiating the storage phosphor layer with a stimulation light beam which is moved along a line over the storage phosphor layer to stimulate the storage phosphor layer into emitting emission light;

a detector for converting the emission light collected into a corresponding detector signal;

sensors on either lateral side of the storage phosphor layer that are irradiated by the stimulation light beam of the laser before and after the stimulation light beam moves over the line to generate a first reference time and a second reference time; and a processing unit configured to:

deduce a number of detector signal values from the detector signal where the number of deduced detector signal values is greater then a predetermined number of pixels of an X-ray picture along the line allocate at least two detector signal values to each of the pixels along the line of the X-ray picture, each of the detector signal values being allocated in response to the first reference time and the second reference time, generate the X-ray picture by deducing a picture signal value for each pixel of the X-ray picture along the line from the at least two of the detector signal values that were allocated to the pixel, which were detected from the same side of the storage phosphor layer, and an interval between a first reference time and a second reference time generated from responses of the sensors.

13. A system in accordance with claim 12, wherein the processing unit samples the detector signal with a sampling frequency f which is greater than a reciprocal value of an average length of time Δt which the stimulation light beam requires in a temporal medium for movement over a pixel of the X-ray picture along the line, where f>1/Δt.

14. A system in accordance with claim 13, wherein the sampling frequency f corresponds to a whole number multiple N of the reciprocal value of the average length of time Δt: f=N/Δt, where N is greater than 1.

15. A system in accordance with claim 14, wherein 2<N<32.

16. A system in accordance with claim 12, wherein the processing unit determines each picture signal value by forming an arithmetical average value from at least two subsequent detector signal values.

17. A system in accordance with claim 12, wherein the processing unit comprises a sample and hold for sampling of the detector signal.

18. A system in accordance with claim 12, wherein the processing unit determines the deduction of the picture signal value of a pixel by forming an average value from at least two detector signal values after deducing the at least two detector signal values from the detector signal.

19. A system in accordance with claim 13, further comprising a low pass filter for filtering the detector signal before sampling to eliminate portions of the detector signal having a frequency $f_g$ which is greater than half the sampling frequency f so that $f_g > 0.5$ f.

20. A system for reading out X-ray information stored in a storage phosphor layer, the system comprising:
- a laser for irradiating the storage phosphor layer with a stimulation light beam which is moved along a line over the storage phosphor layer to stimulate the storage phosphor layer into emitting emission light;
- a detector for converting the emission light collected into a corresponding detector signal;
- sensors on either lateral side of the storage phosphor layer that are irradiated by the stimulation light beam of the laser before and after the stimulation light beam moves over the line to generate a first reference time and a second reference time; and
- a processing unit configured to:
  - deduce a number of detector signal values from the detector signal where the number of deduced detector signal values is greater then a predetermined number of pixels of an X-ray picture along the line
  - allocate at least two detector signal values to each of the pixels along the line of the X-ray picture, each of the detector signal values being allocated in response to the first reference time and the second reference time,
  - generate the X-ray picture by deducing a picture signal value for each pixel of the X-ray picture along the line from said at least two of the detector signal values, and
  - correct detector signal values by increasing a height of a first said detector signal value and reducing a height of an adjacent second said detector signal value.

21. Method in accordance with claim 1, further comprising determining the number of the detector signals values that are used for deducing each picture signal value in response to the time between the first reference time and the second reference time.

22. Method in accordance with claim 10, further comprising determining the number of the detector signals values that are used for deducing each picture signal value in response to the time between the first reference time and the second reference time.

23. A system in accordance with claim 12, wherein the processor determines the number of the detector signals values that are used for deducing each picture signal value in response to the time between the first reference time and the second reference time.

24. A system in accordance with claim 20, wherein the processor determines the number of the detector signals values that are used for deducing each picture signal value in response to the time between the first reference time and the second reference time.

25. Method in accordance with claim 1, further comprising determining the number of the detector signals values that are used for deducing each picture signal value in response to the first reference time and the second reference time.

26. Method in accordance with claim 10, further comprising determining the number of the detector signals values that are used for deducing each picture signal value in response to the first reference time and the second reference time.

27. A system in accordance with claim 12, wherein the processor determines the number of the detector signals values that are used for deducing each picture signal value in response to the first reference time and the second reference time.

28. A system in accordance with claim 20, wherein the processor determines the number of the detector signals values that are used for deducing each picture signal value in response to the first reference time and the second reference time.

* * * * *